United States Patent Office 3,413,238
Patented Nov. 26, 1968

3,413,238
HYDROCARBON CONVERSION CATALYST
Elroy Merle Gladrow and Warren Maxwell Smith, Baton Rouge, La., assignors to Esso Research and Engineering Company, a corporation of Delaware
No Drawing. Filed July 13, 1965, Ser. No. 471,733
18 Claims. (Cl. 252—455)

ABSTRACT OF THE DISCLOSURE

Adjustment of sodium salt concentration of siliceous hydrogel to 0.5 to 5 wt. percent results in improved faujasite-siliceous matrix (e.g. silica-alumina gel) cracking catalyst.

---

This invention relates to an improved process for preparing hydrocarbon conversion catalysts. Particularly, the invention relates to an improved process for preparing hydrocarbon conversion catalysts comprising synthetic crystalline alumino-silicate zeolites which are distributed throughout a siliceous matrix, the catalysts thereby produced, and their use in hydrocarbon conversion processes.

It is well known in the art to improve the quality of hydrocarbons, particularly petroleum hydrocarbons, by catalytic treatment under suitable operating conditions. A wide variety of suitable catalysts is available, and for hydrocarbon conversion processes such as catalytic cracking a synthetic silica-alumina amorphous gel catalyst has been widely used. Additionally, a variety of inorganic oxide gels of either silica alone or silica combined with various other inorganic oxides such as alumina, molybdena, magnesia, chromia, zirconia, thoria, titania, etc., have been employed as catalysts or catalyst supports.

The properties of a catalyst which are of most interest commercially include catalyst activity, selectivity, and stability. These three properties are interrelated; that is, a catalyst of poor stability will tend to degrade under continuous use and regeneration or under extreme conditions, thereby causing undesirable losses in both activity and selectivty. Furthermore, activity and selectivity are both functions of the physical properties of the catalyst such as pore volume and surface area. High pore volume and high surface area are well known attributes of hydrocarbon conversion catalysts due at least in part to the presence of a large number of acid sites.

Recently, new and improved hydrocarbon conversion catalysts have gained wide acceptance within the petroleum industry. These catalysts contain a crystalline alumino-silicate zeolite material, which has been found to be an excellent catalyst and catalyst support possessing excellent activity and selectivity characteristics. However, because of various disadvantages associated with the use of a catalyst consisting essentially of these crystalline alumino-silicate zeolite materials, a recent modification has involved their incorporation into an inorganic oxide matrix such as a siliceous amorphous gel. This has proved desirable for various reasons. For example, the extremely fine size zeolite crystals as they are prepared are usually unsuitable in moving or fluidized bed operations because of carry-over losses. Furthermore, the crystalline zeolites are often too active for direct use as catalysts because of ensuing overconversion and difficulty in controlling product selectivity. The improved form of crystalline alumino-silicate zeolite has been produced by distributing the crystalline zeolite throughout a siliceous gel or cogel matrix. (Typical procedures for accomplishing this are described, for example, in U.S. Patent No. 3,140,249.) The terms "gel" and "cogel" as used herein are intended to include gelatinous precipitates, hydrosols, or hydrogels of silica and/or admixtures of silica and one or more oxides of metals selected from Groups II–A, III–A, and IV–B of the Periodic Table (as set forth in the Handbook of Chemistry and Physics, 38th edition, 1956–57).

Although the composite catalysts containing crystalline alumino-silicate zeolite embedded in a siliceous matrix have proved to be highly useful hydrocarbon conversion catalysts, there is of course the ever-present need for improving their properties while maintaining or reducing their cost of manufacture. The present invention is directed to an improved process for making these composite catalysts, as well as the use of the catalysts in hydrocarbon conversion processes, and is specifically directed to a relatively low cost manufacturing process which produces a composite catalyst having the desired physical and catalytic properties of a similar composite catalyst produced by a relatively high cost manufacturing process.

As mentioned, the catalysts of the invention contain crystalline alumino-silicate zeolitts embedded or "encapsulated" in a siliceous gel matrix. Crystalline alumino-silicate zeolites, commonly referred to as "molecular sieves," are now well known in the art. They are characterized by a highly ordered crystalline structure with uniformly dimensioned pores and are distinguishable from each other on the basis of composition, crystal structure, adsorption properties, and the like. The term "molecular sieves" is derived from the ability of these zeolite materials to selectively adsorb molecules on the basis of their size and form. The various types of molecular sieves may be classified according to the size of the molecules which will be rejected (i.e. not adsorbed) by a particular sieve, their composition, and their X-ray diffraction characteristics. In general, the crystalline alumino-silicate zeolites within the purview of the present invention may be represented by the following formula, expressed in terms of moles:

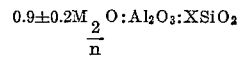

wherein M is selected from the group consisting of metal cations and hydrogen, $n$ is its valence, and X is a number from about 1.5 to about 12. The value of X will vary with the particular zeolite in question. Among the well-known natural zeolites are mordenite, faujasite, chabazite, gmelinite, analcite, erionite, etc. These zeolites differ in structure, composition, and particularly in the ratio of silica to alumina contained in the crystal lattice structure; e.g. modenite, having a ratio of about 8 to about 12; faujasite, having a ratio of about 2.5 to about 7; etc. Similarly, the various types of synthetic crystalline zeolites, e.g. faujasite, mordenite, etc., will also have varying silica to alumina ratios depending upon such variables as composition of crystallization mixture, reaction conditions, etc. U.S. Patent Nos. 3,013,982–86 describe a number of synthetic zeolites, designated therein as zeolites A, D, L, R, S, T, X, and Y.

The processes for producing such crystalline synthetic zeolites are well known in the art. Typically, they involve crystallization from reaction mixtures containing: Al₂O₃ as sodium aluminate, alumina sol, and the like; SiO₂ as sodium silicate and/or silica gel and/or silica sol; alkali metal oxide, e.g sodium hydroxide, either free or in combination with the above components; and water. Careful control is kept over the alkali metal oxide concentration of the mixture, the proportions of silica to alumina and alkali metal oxide to silica, the crystallization period, etc., to obtain the desired product.

The zeolite which will be most preferred in the present invention is the synthetic faujasite variety, wherein "X" in the above formula is about 2.5–7, preferably 3–6, most preferably 4–5.5. It will usually have an average pore diameter of about 6–15, more usually 8–13 angstrom units. A conventional scheme for preparing synthetic sodium faujasite is as follows:

Colloidal silica or silica hydrosol is mixed with a solution of sodium hydroxide and sodium aluminate at ambient temperature. Suitable reactant molar ratios fall within the following ranges: $Na_2O/SiO_2$, 0.28–0.80; $SiO_2/Al_2O_3$, 4–40; $H_2O/Na_2O$, 15–60. The reaction mixture is preferably allowed to digest at ambient temperature for up to 40 hours or more, preferably 1–15 hours, or cooled to below about 80° F., in order to aid crystallization, and then heated to and held at about 180–250° F., e.g. 200–220° F., for a sufficient period to crystallize the product and to achieve maximum crystallinity, e.g. 24–200 hours or more, typically 50–100 hours. A crystalline hydrated sodium alumino-silicate zeolite having a faujasite structure is then separated from the aqueous mother liquor by decantation or filtration, washed, and dried to recover a crystalline product. It is then calcined at temperatures up to about 1000° F. in order to remove the water of hydration and thereby form interstitial channels which confer adsorptive and catalytic properties.

For application as a catalyst, the filtered and washed crystalline alumino-silicate zeolite is subjected before calcining to exchange with a metal cation or a hydrogen ion or a hydrogen-containing cation capable of conversion to a hydrogen ion, or mixtures thereof, to thereby reduce the zeolitic alkali metal content, e.g. sodium content, to less than about 10 wt. percent (as $Na_2O$), preferably less than about 6 wt. percent ($Na_2O$), and most preferably to a content in the range between about 1–5 wt. percent ($Na_2O$) based on the zeolite crystals. It has been found that the alkali metal cations or oxides do not promote the desired hydrocarbon conversions and that beneficial effects on the catalytic properties of the zeolite are obtained when the alkali metal cation content is reduced to the range described. The crystalline alkali metal alumino-silicate can be ion exchanged either before or after the intimate admixture wtih the siliceous matrix. The metal cation suitable for ion exchange can be any cation of a metal of Groups I–B to VIII of the Periodic Table including the rare earth metals, but preferably is a polyvalent member of a group selected from Groups II, III, IV, V, VI–B, VII–B, VIII, the rare earth metals and mixtures thereof. Examples of metal cations suitable for use in ion exchanging are the following: aluminum; barium; cadmium; rare earth metals, such as cerium, praseodymium, lanthanum, neodymium, and samarium; chromium; cobalt; copper; iron; lead; lithium; manganese; nickel; silver; strontium; zinc; tin; platinum; palladium; rhodium; zirconium, etc. Similarly, the alkali metal alumino-silicate can be converted to the hydrogen or acid form in which hydrogen ions occupy the former sites of the alkali metal cations. This may be effected by ion exchange with a hydrogen-containing cation such as, for example, a hydrogen cation or an ammonium cation. The ammonium-exchanged zeolite can be heated to expel ammonia to thereby leave a hydrogen cation in the exchanged site. When employing the zeolite catalyst for the catalytic cracking of hydrocarbons, it is generally preferred to exchange the alkali metal cations with alkaline earth metal cations, particularly magnesium or calcium, as well as aluminum and hydrogen-containing cations and mixtures thereof.

The aforementioned ion exchange is effected by treatment of the zeolite or the zeolite-matrix composite with a suitable salt solution of the aforementioned metal or the hydrogen ion or the hydrogen-containing cation at suitable temperature, e.g 60–170° F. It has generally been preferred to ion exchange the zeolite after its admixture with the siliceous matrix. Suitable salt solutions useful in the ion exchange treatment include the water soluble sulfates, nitrates, chlorides, bromides, iodides, carbonates, thiocyanates, dithiocarbonates, acetates, benzoates, fluorides, etc. of the aforementioned metals. The exchange solutions can contain a salt of a single metal, or mixtures of the above cations, or mixtures of the metallic cations with other type cations, such as the nonmetallic hydrogen ions or ammonium ions. Nonlimiting examples of some particularly desirable salt solutions are magnesium sulfate, calcium chloride, barium chloride, iron sulfate, ammonium chloride, ammonium sulfate, ammonium hydroxide, and ammonium nitrate, etc.

As mentioned, there are numerous methods available for incorporating the crystalline alumino-silicate zeolite component into the siliceous gel matrix. Some of these methods are described in the aforementioned U.S. Patent No. 3,140,249. The method used in the present invention generally comprises adding zeolite crystals to a suitable siliceous hydrogel such as a silica-alumina hydrogel, homogenizing the resulting mixture by passage through a blending apparatus such as a colloid mill, ball mill, and the like and then forming the homogenized slurry into particles of a size range desired for fluidized bed operations. This can be conveniently accomplished by any rapid drying technique, such as spray drying, although other methods may be employed. However, there are two known variations of this particular method of preparing the composite zeolite-matrix catalyst:

(a) The first known method involves forming a suitable hydrogel or gelatinous precipitate such as a silica-alumina hydrogel which, as prepared, contains impurities comprising sodium salts; adding the sodium form of the crystalline alumino-silicate zeolite to the hydrogel; and mixing and drying the mixture. After drying, the resulting zeolite-matrix composite is converted to a catalytic material by washing with water and then exchanging the composite with a suitable salt of the desired cation, such as magnesium sulfate. This method therefore involves the combination of impure, unwashed hydrogel and sodium-form zeolite, subsequent mixing and drying, and final washing and base exchange of the composite.

(b) The second known method involves initially washing the impure hydrogen so as to free it of soluble salts and then combining the washed silica-alumina hydrogel with the desired pre-exchanged form (e.g. Mg-form) of the zeolite, followed by mixing and drying. In this method, therefore, each ingredient (i.e., the zeolite and the matrix material) is separately pretreated to produce the desired forms and then combined to form the zeolite-matrix composite material. This is distinguished from the first method (a) which involves treatment of the final composite to produce the desired washed and exchanged form.

The two methods described above are not entirely satisfactory either from an economic or a catalyst quality standpoint. For example, it has been discovered that catalysts prepared by method (a) above are characterized by relatively low surface area and pore volume after being subjected to contact with steam over substantial periods of time and at elevated temperature. This in turn leads to relatively low stability, activity, and selectivity and therefore detracts from the otherwise excellent catalytic properties of the composite catalysts. Degradation of the catalyst surface area by shrinkage of the pore volume apparently also occurs under the typical reaction conditions of the hydrocarbon conversion process and/or any subsequent regeneration operation, e.g., steam or hot oxygen-containing gas treatment. On the other hand, it has been discovered that catalysts prepared by method (b) above are characterized by high surface area and pore volume retention after similar treatment at elevated temperatures, or in the presence of steam, etc., and that catalytic performance of this type of composite material is excellent. However, the principal drawback associated with method (b) is a relatively high cost of manufacture, which is due in large part to the extensive washing treatment required to achieve a low sodium oxide content in the hydrogel. Thus, in method (b) above, the silica-alumina hydrogel as first supplied normally contains about 6–8 wt. percent dry solids of which about 20 wt. percent are water soluble and consist principally of sodium sulfate, sodium carbonate, and unreacted sodium silicate. Prior procedures have involved extensive wash treatment to remove essentially all of these soluble salts so that the resulting hydrogel contains a negligible amount of sodium, e.g., about 0.2% $Na_2O$ or less. For example, in order to reduce the alkali metal content to such low levels, a total of about eight separate wash treatments is typically required, which is both time consuming and costly.

It can thus be realized that a method for preparing the zeolite-siliceous gel matrix composite catalyst which would produce the desirable properties obtained by method (b) but at a substantially reduced cost is to be highly desired. It has accordingly been discovered that the degradation in surface area and pore volume experienced with method (a) results from the high extraneous salt content of the hydrogel at the time it is subjected to a drying operation, e.g. spray drying, at elevated temperature. Since the spray-drying operation is typically carried out by injecting the gel into a heated zone at about 800° F., it is believed that the combination of high temperature and high soluble salt content results in a shrinkage of the catalyst pores and a consequent reduction in surface area. It is for this reason that the catalyst prepared by method (a) does not perform as well as the catalyst prepared by method (b), and therefore the cost advantage associated with method (a) is substantially decreased due to poorer catalyst performance. It has now been discovered that adjustment of the soluble salt content of the siliceous hydrogel to within the range of about 0.5–5 wt. percent (calculated as $Na_2O$ and based on dry solids) at a time prior to the drying step at elevated temperature, e.g. spray drying, will produce a catalyst having the desired physical properties which is equivalent to or better than catalysts prepared by the aforementioned method (b), with a concomitant substantial reduction in cost of manufacture.

Thus, in accordance with the present invention, an economical and commercially feasible process is provided for preparing a crystalline alumino-silicate zeolite-siliceous gel composite catalyst that is highly active and desirably selective and is characterized by excellent physical stability, high surface area, and pore volume retention after being subjected to extreme conditions such as steaming at elevated temperatures. The process of the invention involves incorporating the crystalline alumino-silicate zeolite into the siliceous hydrogel, said hydrogel having been treated to adjust its soluble salt content to within the range of about 0.5–5 wt. percent (dry solids basis), and thereafter subjecting the admixture to a drying operation, preferably a rapid drying step such as spray drying, to form a composite product comprising crystalline aluminosilicate zeolite crystals dispersed or suspended in a siliceous gel matrix. The resulting catalyst is an extremely active hydrocarbon conversion catalyst exhibiting desirable selectivity and having substantially better stability than similar catalysts prepared by a method such as method (a) described above, while at the same time being economically attractive.

The present method of preparing the catalyst comprises the following steps:

(1) An impure siliceous hydrogel, e.g. a silica-alumina hydrogel, containing a substantial portion of alkali metal oxide impurities, e.g. sodium sulfate, sodium carbonate, sodium silicate, etc., is treated to reduce its soluble salt content to within the range of about 0.5–5.0 wt. percent. This is conveniently accomplished by dewatering the gel over a suitable filtration apparatus such as a rotary drum vacuum filter and thereafter reslurrying the gel in fresh water followed by a second filtration. This procedure is continued until the soluble salt content has been reduced to within the desired range. It has been found, for example, that a single pass of an impure hydrogel containing about 6 wt. percent dry solids of which about 20 wt. percent are water soluble over a rotary drum vacuum filter will dewater the gel to about 11–12 wt. percent total solids and reduce the soluble salt content by about one-half. The gel can then be reslurried in fresh water to reduce the solids content to about 5–6% followed by a second filtration. Each dewatering step will reduce the soluble salt content by about one-half so that it will be readily observed that in order to reduce the soluble salt content to about 0.2 wt. percent, would require about 6 or 7 washing and dewatering treatments, as compared to only 2 or 3 in order to reduce the soluble salt content to within the aforementioned range. This adjustment in the soluble salt content of the hydrogel may be accomplished either before or after its combination with the zeolite component so long as it is done prior to the rapid drying operation, e.g. spray drying, which forms the catalyst composite particles. A sufficient amount of crystalline zeolite is added to the siliceous gel to result in a zeolite concentration of about 2–30 wt. percent, preferably 3–20 wt. percent, more preferably 4–10 wt. percent of crystalline zeolite, in the final dry composite product. The water content of the hydrogel or gelatinous precipitate before spray drying is preferably adjusted to within the range of about 88–96 wt. percent.

(2) The siliceous hydrogel and the zeolite are admixed to form a homogenous mixture. This may be accomplished by passage through a colloid mill, ball mill, etc., in conventional manner. As mentioned, the siliceous hydrogel can be treated to adjust its soluble salt content to within the aforementioned range prior to this admixture. Alternatively, the impure hydrogel can be combined with the zeolite and the composite mixture subjected to the above dewatering steps to reduce the soluble salt content. This alternative has the advantage of increasing the homogeneity of the mixture with each reslurrying step so that the aforementioned milling procedures need not be as extensive.

The zeolite and the siliceous hydrogel may be any one of the various types hereinbefore described, with the preferred form of zeolite being the synthetic faujasite type having a silica to alumina ratio as hereinbefore defined, and the preferred hydrogel being silica-alumina hydrogel. At the point that the zeolite is combined with the siliceous hydrogel, it may either be in its original alkali metal form, e.g. sodium form, or it can be in a pre-exchanged form; i.e., after having been base-exchanged in accordance with the exchange procedures with the cations hereinbefore described. When the zeolite is in its original alkali metal form, the composite product must be suitably exchanged with the desired cation in order to reduce the alkali metal oxide content of the zeolite to within the aforementioned ranges. In this instance, therefore, the exchange procedure will take place after the aforementioned rapid drying operation, e.g. spray drying, and will be performed on the composite product as distinguished from the crystalline zeolite component.

(3) The admixture of siliceous hydrogel and crystalline zeolite is subjected to a drying operation which is preferably a rapid drying technique. This is an important and integral step towards producing a catalyst having the desired activity, selectivity, stability, and attrition resistance. Rapid drying is preferably accomplished by spray drying wherein the fluid admixture of the zeolite and siliceous hydrogel, the soluble salt content of which has been reduced to the aforementioned range and which preferably has a solids content in the range of about 4–12 wt. percent, preferably 6–9 wt. percent, is introduced into a tower through which are flowing hot gases at a temperature in the range of from about 400–850° F. or higher. This procedure is desired because of the increased attrition resistance achieved due to the spherical nature of the particles obtained, as well as the excellent particle size distribution useful in fluidized bed operations, e.g., predominantly 20–100 micron average particle diameter. The particles produced by spray drying have substantially better attrition resistance than composites prepared by other treatments, such as by oven drying and grinding an admixture of zeolite crystals and silica-alumina gel, which methods give jagged particles and nonuniform particle size distribution. Furthermore, the combination of the features of the present process, i.e., the control of the soluble salt content of the zeolite-siliceous gel mixture to within the range of 0.5–5.0 wt. percent prior to the spray drying step, results in a catalyst product having a higher pore volume, higher surface area, improved sintering resistance, and the ability to retain this high pore volume and surface area in the presence of steam at elevated temperature, as compared to a catalyst made from the same initial mixture without the adjustment of soluble salt content.

(4) The spray dried composite catalyst is reslurried in water and/or a suitable salt solution and treated to remove residual soluble materials from the gel matrix and to achieve the desired cationic form of the zeolite and then filtered. About 2–3 such treatments will be suitable. This can be accomplished by any one of several procedures;

(a) The composite catalyst is slurried in 1–5 wt. percent ammonium sulfate solution having an initial pH of about 5.0 to 8.5. The volume of solution is such that about 2–10 grams of ammonium sulfate are used per gram of zeolite in the catalyst. If the zeolite in the final catalyst is desired to be in some cationic form other than ammonium (or hydrogen) then the treated catalyst is additionally treated with a suitable salt solution of the desired metal cation.

(b) Alternatively, the spray dried composite catalyst is slurried in a suitable mixed salt solution comprising ammonium and the metal cations of the desired form of the zeolite. This may be desirable in the instance where the zeolite has been preexchanged prior to its encapsulation into the siliceous hydrogel. If desired, an additional and final treatment without the ammonium salt added may be made.

(c) Alternatively, the spray dried composite catalyst is slurried directly into a 1–5 wt. percent solution of a salt comprising the cation which will provide the desired cation form of the zeolite. As in (b) above, this may be desirable in the instance where the zeolite has been preexchanged before encapsulation or when it is known that the siliceous hydrogel is relatively low in residual salts but still within the limits of our invention.

(5) The catalyst is washed thoroughly with water and dried at a temperature of 200–500° F.

(6) Optionally, the catalyst can then be calcined for short periods of time at 450–1500° F. A rotary tunnel drier can be used and time periods of about 0.1–24, preferably 0.2–8, hours can be employed. The composite may also be subjected to steam treatment at these temperature levels, e.g. 5–30 hours at 850–1500° F.

As another embodiment, it is within the purview of the present invention to utilize the crystalline zeolite component without separation from the mother liquor resulting from its original preparation procedure. Thus, as previously mentioned, the zeolite is prepared from an aqueous reaction mixture containing soda, alumina, and silica. After the reaction has taken place between these ingredients and the crystalline material has formed, it is usually separated by filtration from its mother liquor and washed, dried, etc. However, it is contemplated herein that the zeolite crystals need not be separated from the mother liquor but that the entire mother liquor slurry containing the zeolite crystals can be combined with the siliceous hydrogel and then the mixture resulting therefrom can be treated to reduce the soluble salt content by the procedures hereinbefore described. It will be realized, of course, that in this embodiment the zeolite will be in its original alkali metal form, e.g. sodium form, so that the final spray dried composite will require suitable base exchange as hereinbefore mentioned.

To briefly summarize the various embodiments of the invention, the following procedures are contemplated herein:

(1) The unexchanged zeolite, e.g. sodium form, can be combined with the impure siliceous hydrogel and the mixture treated to reduce the soluble salt content of the latter, followed by spray drying of the mixture;

(2) The unexchanged zeolite, e.g. sodium form, can be combined with the siliceous hydrogel which has already been treated to reduce the soluble salt content to the desired range, followed by spray drying of the mixture;

(3) Pre-exchanged zeolite in the desired cation form (e.g. magnesium, calcium, ammonium forms) can be combined with the siliceous hydrogel which previously have been treated to reduce soluble salt content or alternatively can be so treated after the combination, followed by spray drying;

(4) A mother liquor slurry of zeolite crystals resulting from the zeolite synthesis can be composited with impure siliceous hydrogel, and the total admixture can be treated to reduce soluble salt concentration prior to spray drying; and (5) The siliceous hydrogel in alternative (4) can be first treated to reduce its soluble salt concentration prior to its combination with the mother liquor slurry of zeolite crystals.

The hydrogels useful in the present invention may be used as supplied commercially or may be separately prepared. For example, a silica-alumina hydrogel may be prepared by first producing a hydrous precipitate of silica by mixing a solution of sodium silicate with an acid, e.g. sulfuric acid, to produce a slurry having a pH below 7, usually below about 4; then adding a solution of an aluminum salt, e.g. aluminum sulfate; and adjusting the pH of the mixture to above about 4 by addition of alkaline material, e.g. ammonia, in order to precipitate the alumina. The amount of aluminum salt used will normally be that required to give a silica-alumina precipitate containing about 8–45 wt. percent, preferably 10–30 wt. percent (dry basis), of $Al_2O_3$.

The catalyst prepared by the previously described procedures is an excellent hydrocarbon conversion catalyst and is especially useful for catalytic cracking processes. It may additionally be modified to form a preferred hydrocracking catalyst by incorporation of a catalytic amount of a hydrogenation component. A preferred procedure for preparing a hydrocracking catalyst will comprise utilizing the alkali metal form of the zeolite, adding it to the siliceous hydrogel, adjusting the soluble salts concentration as previously described, spray drying, exchanging with ammonium ion solution (e.g. ammonium sulfate) to reduce the sodium content to the ranges hereinbefore defined, calcining at 750–1100° F. to form the "hydrogen form" of the zeolite, and then treating the spray dried composite product with a platinum group metal compound to incorporate a catalytic amount of platinum group metal into the composite product.

A wide variety of hydrocarbon feed stocks of various origins may be treated with the catalysts of the invention; for example, petroleum, various fractions therefrom, such as catalytic recycle stocks, gas oil, topped crudes, etc., as well as shale oil, synthetic oils, etc. These feeds may contain appreciable quantities of impurities; e.g., oxygen, sulfur, nitrogen, and soluble metal compounds. Operating details for hydrocarbon conversion processes are well known in the art. Fluidized bed operation will be preferred for catalytic cracking. The feed stock is contacted with the catalyst at suitable temperatures, feed rates, pressures, etc., to thereby effect a substantial conversion to lower boiling materials, such as gasoline, middle distillate, etc. For catalytic cracking, suitable operating conditions will usually include a temperature of about 500–1200° F., preferably 750–1000° F.; a pressure of about 0–500 p.s.i.g., preferably 0–200 p.s.i.g.; and a catalyst to oil ratio of 2–25, preferably 4–12.

The invention will be further understood by reference to the following examples which are not to be construed as limiting.

EXAMPLE 1

Part A.—Preparation of sodium form of crystalline alumino-silicate zeolite

The sodium form of a crystalline alumino-silicate zeolite having a silica to alumina mole ratio of about 5.1 was prepared by the following typical procedure.

A solution of 30.0 kilograms of NaOH and 8.5 kilograms of sodium aluminate in 107.5 liters of water was added with stirring to 193.0 kilograms of a 30 wt. percent silica hydrosol ("Ludox"—supplied by E. I. du Pont de Nemours & Co.). Stirring was conducted at ambient temperatures and continued until the mixtures was homogeneous. The mixture was then heated to 210–215° F. and maintained at said temperature for 5½ days to effect crystallization. The crystals were removed from the liquor by filtration and water-washed until the wash water showed a pH of 9.0–9.5. On drying the crystalline alumino-silicate analyzed 13.9% $Na_2O$, 64.0% $SiO_2$, and 21.2% $Al_2O_3$. On a mole basis this corresponds to: 1.08 $Na_2O$:1.0 $Al_2O_3$:5.1 $SiO_2$. The zeolite exhibited a typical faujasite structure as determined by X-ray analysis.

Part B.—Preparation of magnesium form of crystalline alumino-silicate zeolite The above sodium form of crystalline alumino-silicate zeolite was converted to the magnesium form by the following procedure.

Twenty kilograms of the dried sodium zeolite were added to 50 gallons of a 6 wt. percent solution of $MgSO_4$. The slurry was stirred at ambient temperatures (70–80° F.) for 3 hours. Stirring was stopped, the solids were allowed to settle, and the supernatant liquor was removed by decantation. This exchange procedure was repeated two more times using fresh 6% $MgSO_4$ solution each time. The solids were finally water-washed until the wash water gave a negative test for sulfates with barium chloride. On analysis the zeolite contained 5% MgO and 3.85% $Na_2O$.

Part C.—Preparation of prior catalysts and catalysts of the present invention The above sodium form and magnesium form of the crystalline alumino-silicate zeolite were modified by the formation of a composite of zeolite and siliceous matrix in accordance with the following procedures.

(1) Catalyst A was prepared by admixing the above magnesium-form zeolite with a slurry of washed silica-alumina hydrogel, followed by spray drying of the admixture. The washed silica-alumina hydrogel was made by first pumping $CO_2$ into a sodium silicate solution (specific gravity about 1.1) to reduce the pH and effect gelation. After a suitable aging period to establish gel structure, the hydrosol was blended with a stream of dilute sulfuric acid and alumina hydrate to lower the composite gel pH to around 5.0. The combined silica plus alumina content of the composite hydrogel was about 6 wt. percent and comprised 13% alumina. The mixture contained considerable residual soluble salts such as sodium sulfate, sodium carbonate, and sodium silicate. The mixture was then filtered on a rotary drum string filter, which reduced the water content and soluble salt content of the hydrogel by about 50%. The product was reslurried in deionized water to about the original 6 wt. percent (silica plus alumina) content, and the filtration was repeated. This procedure was repeated until the residual soda content had been reduced to about 0.2 wt. percent (on a dry solids basis), which took about seven wash treatments.

The washed, dewatered, hydrous precipitate of silica-alumina (containing about 88% water) was slurried in an equal weight of water, and the magnesium-exchanged zeolite was added in sufficient amount to produce a 5 wt. percent zeolite finished composite catalyst. The composite slurry was then thoroughly mixed to form an essentially homogeneous mixture, spray dried at about 600° F., and finally calcined for 16 hours at 1000° F. to produce a finished catalyst containing 5 wt. percent magnesium zeolite and 95 wt. percent silica-alumina.

(2) Catalyst B was prepared by slurrying the above-described sodium form of the crystalline zeolite in an unwashed silica-alumina hydrogel (containing 13 wt. percent alumina), which hydrogel was prepared by the above-described procedure, except that the washing steps subsequent to the primary filtration were eliminated. After mixing the sodium-form zeolite with the hydrogel and spray drying at about 600° F., the composite material was washed thoroughly in water, filtered, and then slurried in a 5 wt. percent ammonium sulfate solution using about ten equivalents of ammonium ion per equivalent of sodium ion in the zeolite. After one hour the supernatant liquid was decanted, the composite was again washed throughly with water, and the wash water was decanted. The liquid volume was then restored to its original level with water. Into this aqueous slurry there was dissolved sufficient magnesium nitrate to produce a 5 wt. percent solution, using about eight equivalents of magnesium ion per equivalent of sodium and/or ammonium ion in the zeolite. After stirring for about one hour, the supernatant liquid was decanted, the catalyst was again thoroughly washed with water, and finally filtered with a suction filter. This exchange treatment with magnesium nitrate was repeated for an additional three times before final washing, filtering, and oven drying at 225° F. The final catalyst contained 5 wt. percent magnesium-form zeolite embedded in 95 wt. percent silica-alumina (13% alumina).

(3) Catalyst C was prepared by essentially the same procedure as Catalyst A, except that the silica-alumina hydrogel was only partially washed until the residual soda content had been reduced to about 0.7 wt. percent soda with the number of wash treatments required being substantially reduced. The final catalyst comprised 5 wt. percent magnesium-form zeolite and 95 wt. percent silica-alumina. This catalyst exemplifies the catalysts of the present invention.

EXAMPLE 2

Catalysts A, B, and C of Example 1 were calcined initially at 1000° F. for 16 hours and then portions thereof steamed additionally at 1200° F. and 1400° F. at atmospheric pressure for 16 hours. The physical and chemical properties of these catalysts are shown in Table I.

TABLE I

| Catalyst | A | B | C |
| --- | --- | --- | --- |
| Wt. percent $Na_2O$ | 0.28 | 0.24 | 0.65 |
| Calcined at 1,000° F.: | | | |
| Surface area, $M^2/g$ | 430 | 440 | 420 |
| Pore volume, cc./g | 0.85 | 0.68 | 1.10 |
| Steamed at 1,200° F.: | | | |
| Surface area, $M^2/g$ | 280 | 260 | 270 |
| Pore volume, cc./g | 0.82 | 0.52 | 0.90 |
| Steamed at 1,400° F.: | | | |
| Surface area, $M^2/g$ | 160 | 120 | 170 |
| Pore volume, cc./g | 0.65 | 0.44 | 0.76 |

As indicated by the above surface area and pore volume measurements, Catalyst C of the invention is equal to or better than Catalyst A, which, as previously mentioned, has been hitherto preferred for the preparation of high quality catalyst but is subject to the disadvantage of high manufacturing cost due to the extensive washing procedure utilized. Catalyst C of the invention, which was prepared by a procedure utilizing a much less extensive washing treatment, is shown to be of high quality and stability. Catalyst B, on the other hand, in which the soluble salt content of the siliceous gel was not reduced prior to spray drying, is exhibited to be substantially poorer in surface properties after steaming. The beneficial effect of adjusting the soluble salt content of the siliceous hydrogel before it is subjected to extreme temperature conditions is thus demonstrated. By the method of the invention, high pore volume, high surface area, and excellent sintering resistance can be achieved at a lower cost than heretofore realized.

EXAMPLE 3

Catalysts A, B, and C of Example 1 were steamed at 1400° F. and 0 p.s.i.g. for 16 hours. They were then treated in a batchwise fluidized bed-type cracking operation, feeding a 500–700° F. virgin gas oil having a gravity of 33.4° API. The tests were conducted at 950° F. and atmospheric pressure, using a 2-minute cycle time. The results are compared at a constant conversion of 67 wt. percent in Table II.

TABLE II

| Catalyst | A | B | C |
|---|---|---|---|
| Conversion, wt. percent, 430° F | 67 | 67 | 67 |
| Carbon, wt. percent | 2.4 | 2.4 | 1.6 |
| $C_3$-Gas, wt. percent | 9.6 | 10.0 | 8.9 |
| Total $C_4$, wt. percent | 14.4 | 13.9 | 13.8 |
| $C_5$-430° F., wt. percent | 40.6 | 40.7 | 42.7 |
| $C_3H_6$, s.c.f./b. | 163 | 169 | 168 |
| $C_4H_8$, wt. percent | 6.3 | 6.0 | 6.8 |

The above data show that the catalyst of the invention, i.e. Catalyst C, was equally as selective to valuable cracked products as either the relatively expensive Catalyst A or the lower stability Catalyst B.

EXAMPLE 4

In another set of experiments, 3 kilograms of an unwashed silica-alumina hydrogel similar to that described in Example 1, containing 10.2 wt. percent combined silica plus alumina, were mixed with 4.5 liters hot $H_2O$. The mixture was stirred for 20 minutes and suction filtered. The filter cake was then divided into three equal fractions.

Fraction (a) of the filter cake, which had received one water-wash, was slurried in 300 cc. $H_2O$. In a separate vessel 8 grams of oven dried sodium-form faujasite made as described in Example 1 was slurried in 200 cc. $H_2O$ and then blended with the gel slurry. The composite was colloid-milled twice to ensure homogeneity. The mixture was then oven dried at 250–275° F. A portion of the oven dried material analyzed 6.1 wt. percent $Na_2O$, which exceeds the range prescribed by the present invention. The oven dried material was ground and slurried in hot 2% solution of ammonium sulfate several times to reduce the residual $Na_2O$ content of the composite catalyst to 0.23 wt. percent. The catalyst was designated Catalyst D.

Fraction (b) of the filter cake, which had received one water-wash, was given an additional two washes in similar fashion. In a separate vessel 8 grams of oven dried sodium-form faujasite were slurried in $H_2O$ and blended with the three-times washed gel, colloid-milled twice, and then oven dried at 250–275° F. A portion of this material analyzed 3.0% $Na_2O$, which is within the range prescribed by the present invention. The oven dried material was ground, slurried in hot 2% $(NH_4)_2SO_4$ solution several times to reduce the residual $Na_2O$ content of the composite catalyst to 0.20 wt. percent. It was designated Catalyst E.

Fraction (c) of the filter cake, which had received one water-wash, was given an additional four washes in similar fashion. In a separate beaker 8 grams oven dried Na-form faujasite were slurried in $H_2O$ and blended with the five-times washed gel and colloid-milled twice, then oven dried at 250–275° F. A portion of this material analyzed 2.5% $Na_2O$, which is also within the range prescribed by the present invention. The oven dried material was ground, and slurried in hot 2% $(NH_4)_2SO_4$ solution several times to reduce the residual $Na_2O$ content to 0.20 wt. percent. It was designated Catalyst F.

Catalysts D, E, and F, each of which comprised 5% ammonium-form faujasite-95% silica-alumina, were calcined at 1000° F., and then steamed at 1400° F., 0 p.s.i.g. pressure for 16 hours. The surface properties of the steamed catalysts are tabulated in Table III.

TABLE III

| Catalyst | D | E | F |
|---|---|---|---|
| Number of water washes performed on silica-alumina hydrogel before addition of zeolite | 1 | 3 | 5 |
| $Na_2O$ content before oven drying, wt. percent | 6.1 | 3.0 | 2.5 |
| $Na_2O$ content after final exchange treatment, wt. percent | 0.23 | 0.20 | 0.20 |
| Steamed at 1,400° F.: | | | |
| Surface area, $M^2/g$ | 133 | 144 | 150 |
| Pore volume, cc./g | 0.33 | 0.35 | 0.38 |

The above data further demonstrate the superior surface properties of the catalysts of the invention, Catalysts E and F, after being subjected to steam treatment. As indicated, adjustment of the soda content of the silica-alumina hydrogel prior to oven drying is beneficial.

EXAMPLE 5

In another set of experiments, the sodium-form faujasite was blended into the unwashed silica-alumina hydrogel and the composite was water-washed, oven dried, and ion exchanged with ammonium salt solution.

Three kilograms of unwashed silica-alumina hydrogel prepared similarly to that described in Example 1, containing 10.2 wt. percent combined silica plus alumina, were mixed with 3 liters hot water and 24 grams oven dried sodium-form faujasite similar to that of Example 1. The mixture was stirred for 20 minutes and suction filtered. The filter cake was divided into equal portions.

Fraction (a) was placed in an oven and dried at 250–275° F. A portion was analyzed and showed 7.0 wt. percent $Na_2O$. The ground powder was slurried in hot 2% $(NH_4)_2SO_4$ solution several times to reduce its $Na_2O$ content to about 0.2 wt. percent. It was designated Catalyst G.

Fraction (b) of the filter cake, which had been hot water-washed one itme, was water-washed additionally in similar fashion. After suction filtering the cake was oven dried at 250–275° F. A portion of the material analyzed 2.5 wt. percent residual $Na_2O$. The ground, oven dried powder was slurried in hot 2% ammonium sulfate solution several times to reduce its $Na_2O$ content to about 0.2 wt. percent. It was designated Catalyst H.

Catalysts G and H, each of which comprised 5% $NH_4$-form faujasite-95% silica-alumina, were heated at 1000° F. and then steamed at 1400° F. and atmospheric pressure for 16 hours. The surface properties of the steamed catalysts are presented in Table IV.

TABLE IV

| Catalyst | G | H |
|---|---|---|
| $Na_2O$ content before drying, wt. percent | 7.0 | 2.5 |
| $Na_2O$ content after final exchange treatment, wt. percent | 0.2 | 0.2 |
| Steamed at 1,400° F.: | | |
| Surface area, $M^2/g$ | 146 | 148 |
| Pore volume, cc./g | 0.35 | 0.42 |

The above data demonstrate the improved stability towards pore volume loss which results from the reduction of soluble salt level in the silica-alumina gel before the initial drying step, even under the mild oven drying conditions utilized in this example as compared to the more severe treatment at 600–800° F. and higher in commercial spray drying equipment.

What is claimed is:

1. An improved method for preparing a catalyst composition comprising a crystalline alumino-silicate zeolite having uniform pore openings dispersed in a siliceous gel matrix, which method comprises combining said zeolite with a siliceous gel, said gel having a soluble salt content within the range of about 0.5 to 5 wt. percent, and drying the resulting composite mixture.

2. The method of claim 1 wherein the sodium oxide content of said zeolite prior to said combination has been reduced to less than about 10 wt. percent by virtue of base exchange with a metal cation or a hydrogen-containing cation.

3. The method of claim 1 wherein the sodium oxide content of said zeolite is reduced to less than about 10 wt. percent subsequent to said combination by virtue of base exchange with a metal cation or a hydrogen-containing cation.

4. The method of claim 1 wherein said siliceous gel is silica gel or a cogel of silica and at least one other oxide of a metal in either Groups II–A, III–A, or IV–B of the Periodic Table.

5. The method of claim 4 wherein said siliceous gel is silica-alumina gel.

6. An improved process for preparing a catalyst composition comprising a crystalline alumino-silicate zeolite embedded in a siliceous gel matrix, said siliceous gel being silica gel, or a cogel of silica and at least one other oxide of a metal in Groups II–A, III–A, or IV–B of the Periodic Table; which process comprises (1) admixing said zeolite with a slurry of a siliceous hydrogel of the siliceous material desired in said matrix, which siliceous hydrogel has been treated to reduce its soluble salt content to within the range of about 0.5 to 5 wt. percent, (2) drying said admixture at elevated temperature, (3) contacting the dried composite with ammonium ion, (4) washing said composite with water, and (5) drying said composite.

7. The process of claim 6 wherein said zeolite has a silica-to-alumina mole ratio of about 2.5 to 7.

8. The process of claim 6 wherein said zeolite has a crystal structure similar to the mineral faujasite and a silica-to-alumina mole ratio of about 3 to 6.

9. The process of claim 6 wherein said zeolite contains less than about 10 wt. percent alkali metal oxide by virtue of its having been base exchanged with a metal cation or a hydrogen-containing cation prior to its admixture with said siliceous gel.

10. The process of claim 6 wherein said zeolite is added in an amount sufficient to produce 2 to 30 wt. percent zeolite in said catalyst composition.

11. The process of claim 6 wherein said drying is accomplished by spray drying.

12. The process of claim 6 wherein said zeolite is combined with said siliceous gel in the form of a mother liquor slurry resulting from the zeolite synthesis.

13. An improved process for preparing a catalyst composition comprising a desired cation form of a crystalline alumino-silicate zeolite embedded in a silica-alumina matrix, said zeolite having uniform pore openings between about 6 and 15 angstrom units and a silica-to-alumina mole ratio of about 2.5 to 7, and containing less than about 10 wt. percent $Na_2O$ by virtue of its having been base exchanged with said desired cation; which process comprises admixing said zeolite in the desired cation form with an aqueous slurry of silica-alumina hydrogel which has been pretreated to reduce its soluble salt content to within the range of about 0.5 to 5 wt. percent, said zeolite being added in an amount sufficient to produce 2 to 30 wt. percent zeolite in said composition upon removal of water, spray drying the resulting admixture to form a composite material comprising said zeolite embedded in said matrix, contacting said composite material with ammonium ion solution, and water-washing and drying the composite material.

14. An improved catalyst composition comprising a crystalline zeolite dispersed in a siliceous matrix, said catalyst composition having been prepared by a process comprising combining said zeolite with a siliceous gel, reducing the soluble salt content of the gel to within the range of about 0.5 to 5 wt. percent and drying the zeolite-siliceous gel composite.

15. The composition of claim 14 wherein said zeolite contains less than about 10 wt. percent sodium oxide by virtue of its having been base exchanged with a metal cation or a hydrogen-containing cation.

16. The composition of claim 14 wherein said siliceous gel is silica-alumina.

17. The composition of claim 14 wherein said zeolite has a crystal structure similar to the mineral faujasite and a silica-to-alumina mole ratio of about 2.5 to 7.

18. The composition of claim 14 which contains about 2 to 30 wt. percent of said zeolite.

References Cited

UNITED STATES PATENTS

| | | | |
|---|---|---|---|
| 3,140,249 | 7/1964 | Plank et al. | 208—120 |
| 3,207,701 | 9/1965 | Curtin | 252—455 XR |
| 3,329,628 | 7/1967 | Gladrow et al. | 252—453 |

PATRICK P. GARVIN, *Primary Examiner.*

C. F. DEES, *Assistant Examiner.*